(12) United States Patent
Hong et al.

(10) Patent No.: US 11,688,554 B2
(45) Date of Patent: Jun. 27, 2023

(54) TANTALUM CAPACITOR AND MANUFACTURING METHOD THEREOF

(71) Applicant: SAMSUNG ELECTRO-MECHANICS CO., LTD., Suwon-si (KR)

(72) Inventors: Jin Ho Hong, Suwon-si (KR); Hyun Sub Oh, Suwon-si (KR); Youn Soo Kim, Suwon-si (KR); Hong Kyu Shin, Suwon-si (KR); Hee Sung Choi, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/188,084

(22) Filed: Mar. 1, 2021

(65) Prior Publication Data

US 2022/0093327 A1 Mar. 24, 2022

(30) Foreign Application Priority Data

Sep. 23, 2020 (KR) .................. 10-2020-0122725

(51) Int. Cl.
| | | |
|---|---|---|
| H01G 2/02 | (2006.01) | |
| H01G 2/10 | (2006.01) | |
| H01G 9/048 | (2006.01) | |
| H01G 9/012 | (2006.01) | |
| H01G 9/08 | (2006.01) | |
| H01G 9/15 | (2006.01) | |
| H01G 9/04 | (2006.01) | |

(52) U.S. Cl.
CPC .............. *H01G 2/02* (2013.01); *H01G 2/10* (2013.01); *H01G 9/012* (2013.01); *H01G 9/048* (2013.01); *H01G 9/08* (2013.01); *H01G 9/15* (2013.01); *H01G 2009/05* (2013.01)

(58) Field of Classification Search
CPC ............. H01G 9/012; H01G 9/15; H01G 9/08
See application file for complete search history.

(56) References Cited

U.S. PATENT DOCUMENTS

| | | | | |
|---|---|---|---|---|
| 2008/0247122 A1* | 10/2008 | Vaisman | ................... | H01G 9/15 29/25.03 |
| 2009/0244814 A1* | 10/2009 | Tokashiki | .............. | H01G 4/224 29/25.03 |
| 2011/0032662 A1* | 2/2011 | Ihara | .................... | H01G 9/0029 29/25.03 |
| 2012/0182668 A1* | 7/2012 | Kim | ........................ | H01G 9/15 216/13 |

(Continued)

FOREIGN PATENT DOCUMENTS

| | | | |
|---|---|---|---|
| JP | 2001257130 A | * | 9/2001 |
| JP | 2007-184308 A | | 7/2007 |

(Continued)

*Primary Examiner* — Eric W Thomas
(74) *Attorney, Agent, or Firm* — Morgan, Lewis & Bockius LLP

(57) ABSTRACT

A tantalum capacitor includes: first and second surfaces facing in a first direction, third and fourth surfaces facing in a second direction, and fifth and sixth surfaces facing in a third direction; a tantalum body having one surface through which a tantalum wire is exposed in the first direction; and a substrate on which the tantalum body is mounted, wherein the substrate may be an organic-inorganic composite substrate.

32 Claims, 16 Drawing Sheets

(56) References Cited

U.S. PATENT DOCUMENTS

| | | | |
|---|---|---|---|
| 2015/0077905 A1* | 3/2015 | Shin | H05K 1/181 |
| | | | 361/529 |
| 2015/0131206 A1 | 5/2015 | Kwak et al. | |
| 2016/0133388 A1 | 5/2016 | Fang et al. | |
| 2017/0178821 A1* | 6/2017 | Summey | H01G 9/15 |

FOREIGN PATENT DOCUMENTS

| | | | | |
|---|---|---|---|---|
| JP | 2008-140976 A | | 6/2008 | |
| JP | 2009004671 A | * | 1/2009 | |
| JP | 2009194200 A | * | 8/2009 | H01G 9/012 |
| JP | 2010287588 A | * | 12/2010 | |
| KR | 10-2015-0053425 A | | 5/2015 | |
| KR | 10-2016-0054809 A | | 5/2016 | |
| WO | WO-2006024257 A1 | * | 3/2006 | H01G 2/065 |

\* cited by examiner

TANTALUM CAPACITOR AND MANUFACTURING METHOD THEREOF

CROSS-REFERENCE TO RELATED APPLICATION

This application claims the benefit of priority to Korean Patent Application No. 10-2020-0122725, filed on Sep. 23, 2020 with the Korean Intellectual Property Office, the entire disclosure of which is incorporated herein by reference.

TECHNICAL FIELD

The present disclosure relates to a tantalum capacitor and a manufacturing method thereof.

BACKGROUND

A tantalum (Ta) material is a metal having mechanical or physical characteristics such as a high melting point, excellent ductility and excellent corrosion-resistance, and is widely used in various fields throughout industries such as the electrical, electronic, mechanical, chemical, aerospace, and defense industries. Since the tantalum material may form a stable anodic oxide film, tantalum has been widely used as a material in forming positive electrodes for small capacitors. Recently, in accordance with the rapid development of information technology (IT) industries, such as electronics information and communications technology (ICT) and electronics technology, tantalum has been increasingly used on a year-on-year basis.

Conventional tantalum capacitors use a structure in which a terminal is extracted externally using a structure having an internal lead frame or a structure without an internal lead frame or frame, in order to connect the tantalum material and the electrode.

In this case, withdrawal of an electrode of a tantalum capacitor that does not use a conventional frame is performed in a manner in which a tantalum body and a positive electrode wire are connected to a lower electrode, respectively, and is performed in a manner of being drawn out to the lower electrode. In the conventional lower electrode structure, a structure using a connection portion connected to a positive electrode wire and a tantalum wire, and a via connecting an external terminal has been used. However, the connection through the via has a problem in that ESR characteristics may be deteriorated due to a limited contact region, and it may be difficult to reduce the thickness of the substrate due to a need for a spacer used to place the via inside the substrate. Accordingly, there may be a problem in that the capacity of the tantalum capacitor may be limited.

The information disclosed in the Background section above is to aid in the understanding of the background of the present disclosure, and should not be taken as acknowledgement that this information forms any part of prior art.

SUMMARY

An aspect of the present disclosure is to provide a tantalum capacitor with reduced equivalent series resistance (ESR).

An aspect of the present disclosure is to provide a tantalum capacitor having high capacity.

One of various objects of the present disclosure is to improve productivity by improving process efficiency.

An aspect of the present disclosure is to provide a tantalum capacitor having excellent reliability by improving mechanical strength.

According to an aspect of the present disclosure, a tantalum capacitor includes: first and second surfaces facing in a first direction, third and fourth surfaces facing in a second direction, and fifth and sixth surfaces facing in a third direction; a tantalum body having one surface through which a tantalum wire is exposed in the first direction; and a substrate on which the tantalum wire is mounted, wherein the substrate may be an organic-inorganic composite substrate.

According to another aspect of the present disclosure, a manufacturing method of a tantalum capacitor includes operations of: etching a resist layer on a base film in which a carrier film, a base metal layer, and a first resist layer are sequentially stacked; and forming a first plating layer on the etched portion of the base film.

According to another aspect of the present disclosure, a method of manufacturing a tantalum capacitor includes operations of: forming and etching a first resist layer on a base film in which a carrier film, a base metal layer, and a first metal layer are sequentially stacked; and etching the first metal layer exposed to the etched portion of the base film.

According to another aspect of the present disclosure, a tantalum capacitor includes: a tantalum body having one surface through which a tantalum wire is exposed in a first direction; and a substrate on which the tantalum body is mounted in a second direction, wherein the substrate includes first and second resist layers, stacked one another in the second direction, and first and second through-holes penetrating the first and second resist layers in the second direction, and two layers of positive electrodes are disposed in the first through-hole and two layers of negative electrodes are disposed in the second through-hole.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
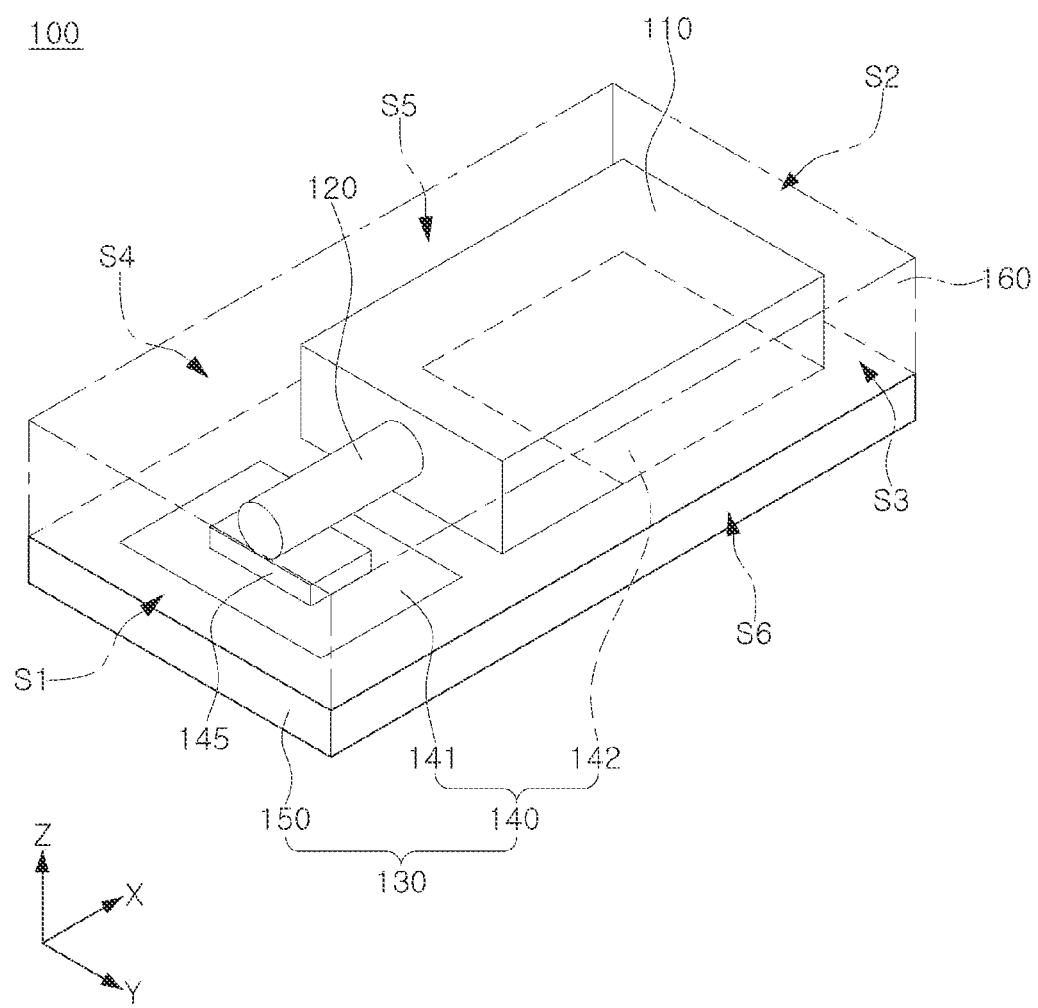
FIG. 1 is a perspective view illustrating a tantalum capacitor according to an embodiment of the present disclosure.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction or a length direction, a Y direction as a second direction, a W direction or a width direction, and a Z direction as a third direction, a T direction, or a thickness direction.

Figure 2:
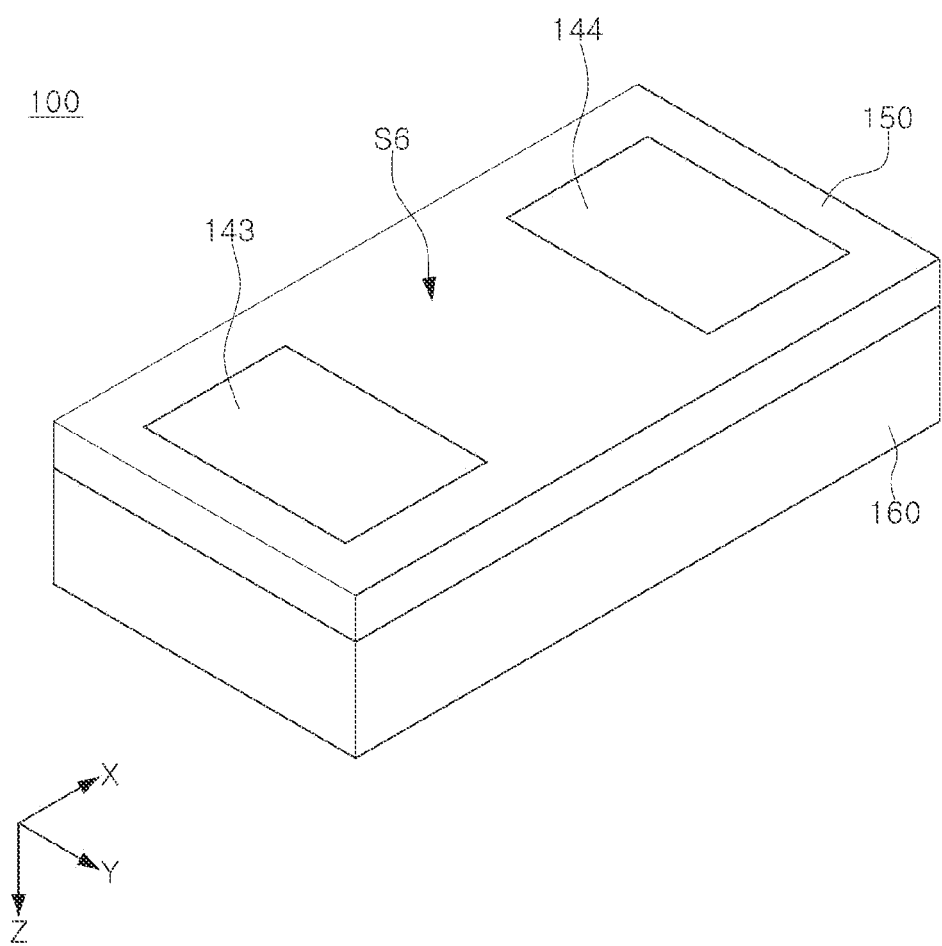
FIG. 2 is a bottom view of the tantalum capacitor of FIG. 1 as viewed from a sixth surface S6 direction.
Figure 3:
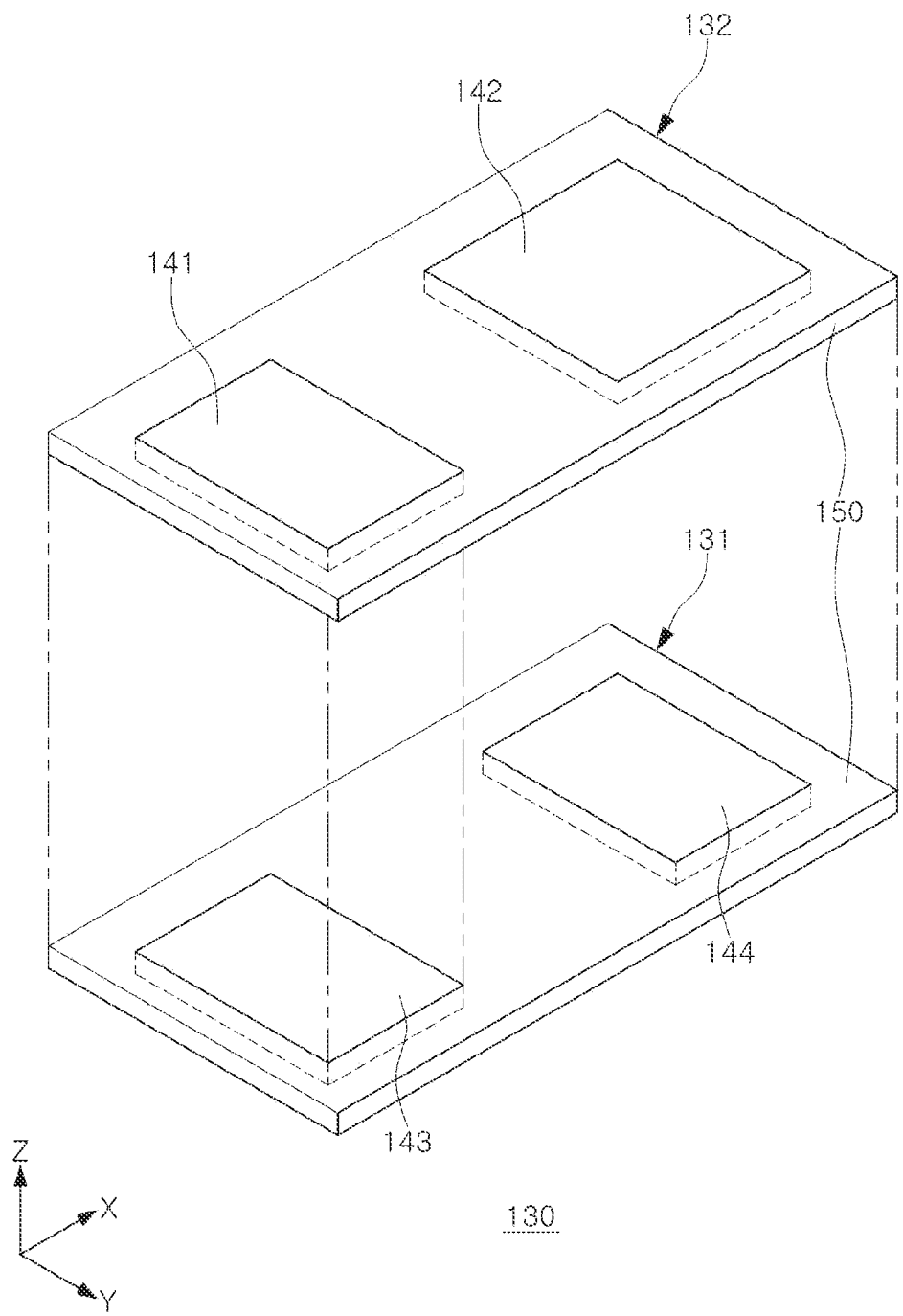
FIG. 3 is an exploded perspective view schematically illustrating the substrate of FIG. 1.

FIG. 1 is a schematic perspective view of a tantalum capacitor according to an embodiment of the present disclosure, FIG. 2 is a bottom view of the tantalum capacitor, and FIG. 3 is an exploded perspective view schematically illustrating the substrate of FIG. 1.

Referring to FIGS. 1 to 3, a tantalum capacitor 100 according to an embodiment of the present disclosure may include: a tantalum body 110 to which a tantalum wire 120 is exposed to one surface; and a substrate 130 on which the tantalum body 110 is mounted. The substrate 130 may be an organic-inorganic composite substrate. In the present specification, the term "organic-inorganic composite substrate" may mean a substrate in which an organic material and an inorganic material are mixed, the organic material may mean a material containing a hydrocarbon compound, and the inorganic material may mean a component excluding organic materials. The tantalum capacitor according to the present disclosure may improve the strength of the substrate by using an organic-inorganic composite substrate, and may reduce the thickness of the substrate, thereby implementing low resistance and/or high capacity characteristics.

The tantalum capacitor 100 according to the present disclosure may include first and second surfaces S1 and S2 (first and second end surfaces) facing in a first direction (X direction), and third and fourth surfaces S3 and S4 facing in a second direction (Y direction), and fifth and sixth surfaces S5 and S6 facing in a third direction (Z direction).

Referring to FIGS. 1 and 2, the tantalum capacitor 100 according to the present disclosure may have a structure in which the substrate 130 is exposed to the sixth surface S6.

According to an embodiment of the present disclosure, the tantalum capacitor 100 according to the present disclosure may include a tantalum body 110 on which the tantalum wire 120 is exposed. The tantalum body 110 may be formed using a tantalum material. A method of manufacturing the tantalum body 110 is not particularly limited, but for example, tantalum (Ta) powder and a binder are mixed at a certain ratio and stirred, and the mixed powder is compressed and formed into a substantially rectangular parallelepiped and then sintered under high temperature and high vacuum to manufacture the tantalum body 110.

In addition, the tantalum body 110 may have a tantalum wire 120 exposed in the X direction of the tantalum body 110. The tantalum wire 120 may be mounted by being inserted into the mixture of the tantalum powder and the binder so as to be eccentric from a center thereof, before compressing the powder mixed with the tantalum powder and the binder. That is, the tantalum body 110 may insert and mount the tantalum wire 120 in the tantalum powder mixed with a binder to form a tantalum element having a desired size, and then the tantalum element are sintered under a high temperature and high vacuum ($10^{-5}$ torr or less) atmosphere for about 30 minutes to manufacture the tantalum body 110.

A solid electrolyte layer (not shown) may be disposed on the surface of the tantalum body 110 for cathodicization. The solid electrolyte layer may include one or more of a conductive polymer or manganese dioxide ($MnO_2$). When the solid electrolyte layer is formed of a conductive polymer, it may be formed on a surface of the tantalum body 110 by a chemical polymerization method or an electrolytic polymerization method. A material of the conductive polymer material is not particularly limited as long as it is a conductive polymer material having conductivity, and may include, for example, polypyrrole, polythiophene, polyacetylene, and/or polyaniline. When the solid electrolyte layer is formed of manganese dioxide ($MnO_2$), the tantalum body may be immersed in a manganese aqueous solution such as manganese nitrate, and then the manganese aqueous solution is thermally decomposed to form conductive manganese dioxide on the surface of the tantalum body 110.

A negative electrode reinforcing layer (not shown) may be additionally disposed on the surface of the solid electrolyte layer of the tantalum body 110 as necessary. The negative electrode reinforcing layer may be a layer in which a carbon layer and a silver (Ag) layer are stacked. The carbon layer is for reducing contact resistance of the surface of the tantalum body 110, and the silver (Ag) layer is a material having high electrical conductivity and is generally used to form a conductive layer in the present technical field, but the present disclosure is necessarily limited thereto.

According to an embodiment of the present disclosure, the substrate 130 of the tantalum capacitor 100 may have a two-layer structure including a first layer 131 including a substrate mounting surface and a second layer 132 on which the tantalum body 110 is mounted.

FIG. 3 is an exploded perspective view illustrating a substrate 130 of a tantalum capacitor 100 according to the present example. Referring to FIG. 3, the substrate 130 of the tantalum capacitor 100 of the present embodiment may include a first layer 131 and a second layer 132, and the first layer 131 and the second layer 132 may be stacked in a third direction (Z direction). The first layer 131 of the substrate 130 may include a substrate mounting surface on which the tantalum capacitor 100 according to the present disclosure is mounted on the substrate 130.

The substrate mounting surface may be the sixth surface S6 of the tantalum capacitor 100 according to the present disclosure. A second layer 132 of the substrate 130 may have a surface, opposite to the substrate mounting surface of the first layer 131, and the first layer 131 and the second layer 132 may be disposed to be in contact with each other in a stacking direction (Z direction). In this case, the tantalum body 110 may be mounted on the surface of the second layer 132, opposite to a surface of which the second layer 132 is in contact with the first layer 131 in the third direction (Z direction). The contact between the first layer 131 and the second layer 132 may be visually confirmed through a scanning electron microscope (SEM) or the like.

In one example, the substrate 130 of the tantalum capacitor 100 according to the present disclosure may include a positive electrode connection portion 141 connected to the tantalum wire 120, a negative electrode connection portion 142 connected to the tantalum body 110, a positive electrode terminal 143 connected to the positive electrode connection portion 141, and a negative electrode terminal 144 connected to the negative electrode connection portion 142.

In one example, the substrate 130 may include first and second resist layers 131 and 132, stacked one another in the third direction (Z direction), and first and second through-holes penetrating the first and second resist layers 131 and 132 in the third direction (Z direction). The positive electrode connection portion 141 and the positive electrode terminal 143 may be disposed in the first through-hole, and the negative electrode connection portion 142 and the negative electrode terminal 144 may be disposed in the second through-hole.

Referring to FIGS. 1 and 3, the positive electrode connection portion 141 and the negative electrode connection portion 142 may be disposed on the second layer 132 of the substrate 130, and the positive electrode terminal 143 and the negative electrode terminal 144 may be disposed on the first layer 131 of the substrate 130. The positive electrode terminal 143 disposed on the first layer 131 of the substrate 130 may be connected to the tantalum wire 120 through the positive electrode connection portion 141, and the negative electrode terminal 144 disposed on the first layer 131 of the substrate 130 may be connected to the tantalum body 110 through the negative electrode connection portion 142.

In one example, a lower surface of the positive electrode connection portion 131 and an upper surface of the positive electrode terminal 143 of the substrate 130 of the tantalum capacitor 100 according to the present disclosure may be disposed to be in contact with each other, and a lower surface of the negative electrode connection portion 142 and an upper surface of the negative electrode terminal 144 may be disposed to be in contact with each other.

Referring to FIG. 3, an upper surface of the positive electrode terminal 143 disposed on the first layer 131 of the substrate 130 and a lower surface of the positive electrode connection portion 141 disposed on the second layer 132 thereof may be disposed to be in contact with each other, which may mean that one surface of the positive electrode terminal 143 in the third direction (Z direction) is disposed to be in contact with one surface of the positive electrode connection portion 141 in the third direction (Z direction). In addition, an upper surface of the negative electrode terminal 144 disposed on the first layer 131 of the substrate 130 and a lower surface of the negative electrode connection portion 142 disposed on the second layer 132 thereof may be disposed to be in contact with each other, which may mean one surface of the negative electrode terminal 144 in the third direction (Z direction) is disposed to be in contact with one surface of the negative electrode connection portion 142 in the third direction (Z direction).

In a conventional frameless structure, the positive electrode connection portion and the positive electrode terminal are connected through a via, and the negative electrode connection portion and the negative electrode terminal are also connected through a via, but the tantalum capacitor 100 according to the present disclosure may have a structure in which the positive electrode connection portion 141 and/or the negative electrode terminal 144 and the negative electrode connection portion 142 are connected face-to-face, such that low ESR can be realized. In addition, since a space in which the vias are disposed is not required, the thickness of the substrate can be reduced by the height of the via, thereby maximizing the capacity of the tantalum body within the same device size, thereby implementing a high-capacity tantalum capacitor.

In one example of the present disclosure, the positive electrode connection portion 141 and the negative electrode connection portion 142 of the tantalum capacitor 100 according to the present disclosure may have a length and/or a width, greater than a thickness, respectively.

Referring to FIG. 3, the length and/or width of the positive electrode connection portion 141 and the negative electrode connection portion 142 of the tantalum capacitor 100 according to the present disclosure is greater than the thickness, which may mean a structure in which the length of the positive electrode connection portion 141 and the negative electrode connection portion 142 in the first direction (X direction) is greater than the thickness in the third direction (Z direction) and/or a structure in which the width of the positive electrode connection portion 141 and the negative electrode connection portion 142 in the second direction (Y direction) is greater than the thickness in the third direction (Z direction). Since the positive electrode connection portion 141 and the negative electrode connection portion 142 may have a structure whose length and/or width are greater than the thickness, a contact area with the positive electrode terminal 143 and the negative electrode terminal 144 can be increased, thereby effectively reducing resistance.

In another example of the present disclosure, the positive electrode terminal 143 and the negative electrode terminal 144 of the tantalum capacitor 100 according to the present disclosure may have a length and/or a width, greater than a thickness, respectively. Referring to FIG. 3, the length and/or width of the positive electrode terminal 143 and the negative electrode terminal 144 of the tantalum capacitor 100 according to the present disclosure is greater than the thickness, which may mean a structure in which the length of the positive electrode terminal 143 and the negative electrode terminal 144 in the first direction (X direction) is greater than the thickness in the third direction (Z direction) and/or a structure in which the width of the positive electrode terminal 143 and the negative electrode terminal 144 in the second direction (Y direction) is greater than the thickness in the third direction (Z direction). Since the positive electrode terminal 143 and the negative electrode terminal 144 may have a structure whose length and/or width are greater than the thickness, a contact area with the positive electrode connection portion 141 and the negative electrode connection portion 142 can be increased, thereby effectively reducing resistance.

According to an embodiment of the present disclosure, the tantalum capacitor 100 of the present disclosure may further include a positive electrode junction portion 145 disposed on the substrate 130. In this case, the positive electrode junction portion 145 may be connected to the positive electrode connection portion 141 and the tantalum wire 120. Referring to FIG. 1, the positive electrode junction portion 145 may be disposed on the positive electrode connection portion 141 in a third direction (Z direction) to be connected to the tantalum wire 120.

A lower surface of the positive electrode connection portion 141 and an upper surface of the positive electrode terminal 143 of the tantalum capacitor according to the present disclosure may be disposed to be in contact with each other. In this case, the positive electrode connection portion 141 and the positive electrode terminal 143 may have different sizes from each other, and the positive electrode connection portion 141 may be disposed to be skewed in any one direction of the first direction (X direction).

Figure 4A:
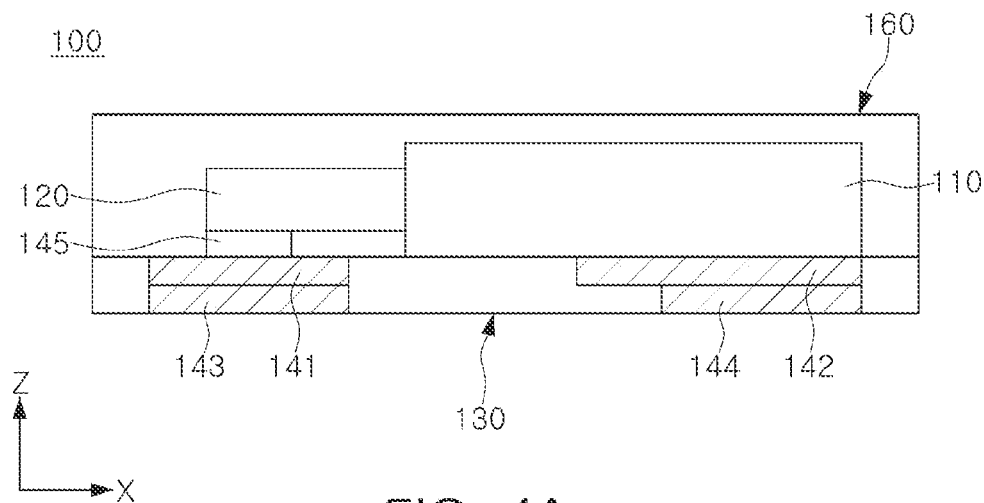
FIGS. 4A to 4C are cross-sectional views illustrating a modified form of a tantalum capacitor according to an embodiment of the present disclosure.
Figure 4B:
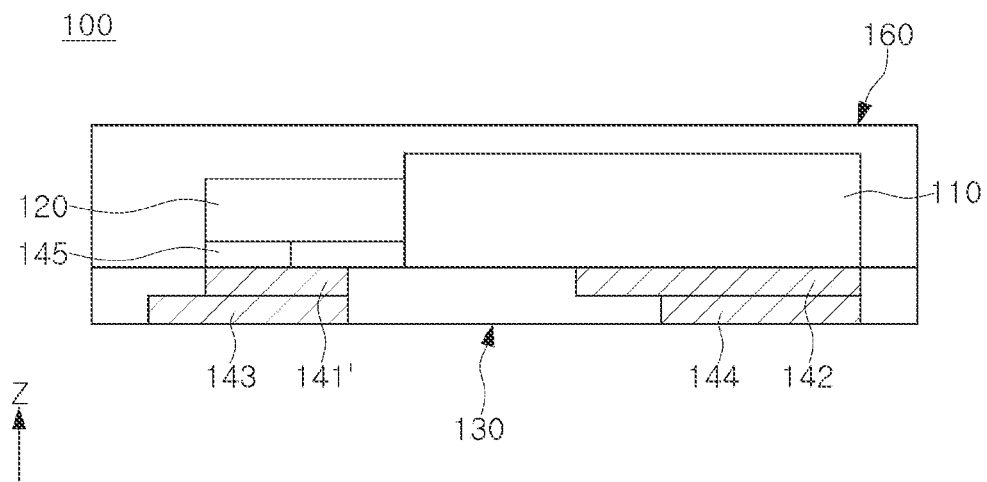
Figure 4C:
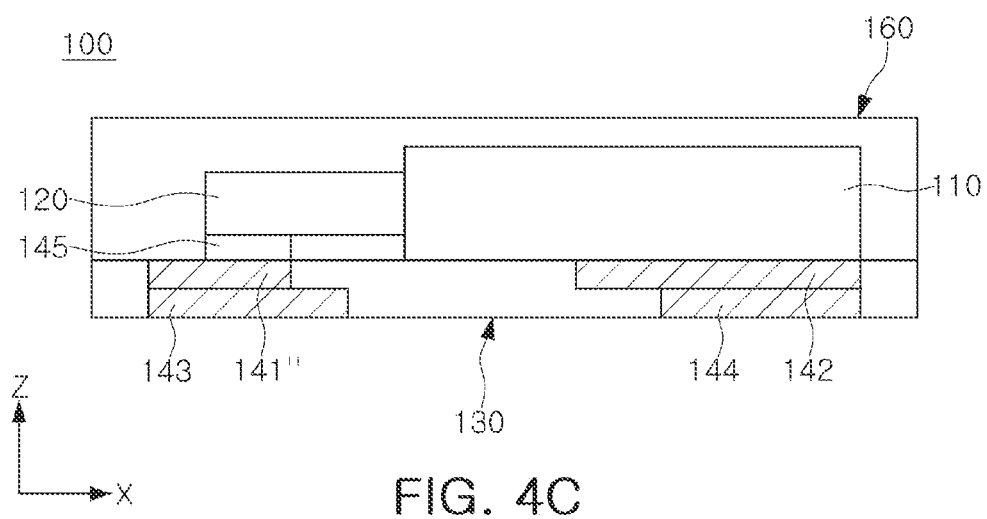
Figure 5:
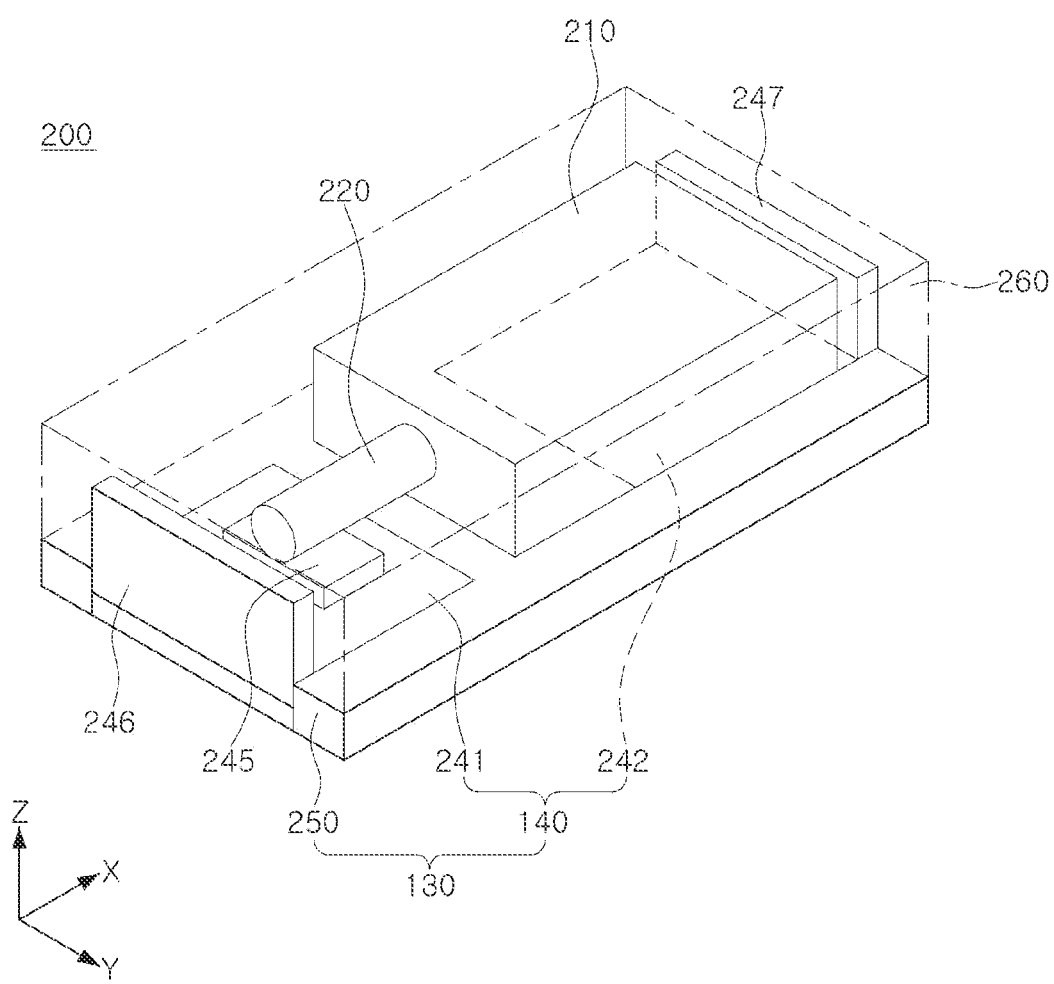
FIG. 5 is a perspective view illustrating a tantalum capacitor according to another embodiment of the present disclosure.
Figure 6:
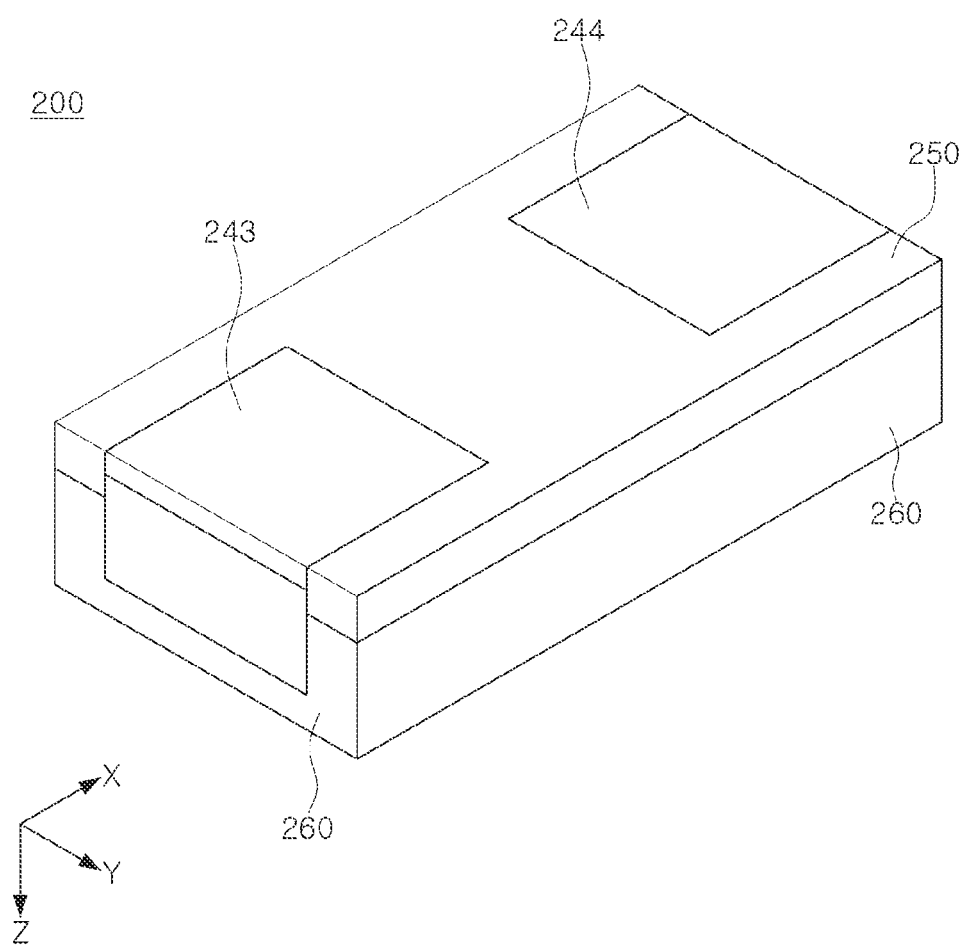
FIG. 6 is a bottom view of the tantalum capacitor of FIG. 5 as viewed from a sixth surface S6 direction.

FIGS. 4A to 4C show a modified form of a dispositional form of the positive electrode connection portion 141 and the positive electrode terminal 143. Referring to FIGS. 4A to 4C, the positive electrode connection portion 141 and the positive electrode terminal 143 of the tantalum capacitor 100 according to the present disclosure may have substantially the same lengths as each other (FIG. 4A) or different lengths from each other (FIGS. 4B and 4C). In addition, the positive electrode connection portion 141 may be disposed to be skewed in any one direction of the first direction (X direction) with respect to the positive electrode terminal 143 (FIGS. 4B and 4C). When the positive electrode connection portion 141 and the positive electrode terminal 143 are disposed to be in contact with a large area, mechanical strength of the tantalum capacitor 100 having a two-layer substrate structure may be improved. In addition, when the positive electrode connection portion 141 is disposed to be skewed towards the first surface S1 of the tantalum capacitor 100, and away from the tantalum body 110 in the first direction, with respect to the positive electrode terminal 143 (FIG. 4C), an interval between the tantalum body 110 and the positive electrode connection portion 141 can be maximized to prevent shorts. In the present example, the description was made based on the positive electrode connection portion 141 and the positive electrode terminal 143, but the same modified form may also be applied to the negative electrode connection portion 142 and the negative electrode terminal 144.

The positive electrode connection portion 141, the negative electrode connection portion 142, the positive electrode terminal 143, the negative electrode terminal 144, and/or the positive electrode junction portion 145 of the tantalum capacitor 100 according to the present disclosure may be made of conductive metal including nickel (Ni), tin (Sn), copper (Cu), a chromium titanium intermetallic compound (Cr(Ti)), palladium (Pd), iron (Fe), and/or an alloy thereof.

In one example, the positive electrode connection portion 141, the negative electrode connection portion 142, the positive electrode terminal 143, the negative electrode terminal 144, and/or the positive electrode junction portion 145 of the tantalum capacitor 100 of the present disclosure may be a plating layer. As will be described later, when the positive electrode connection portion 141, the negative electrode connection portion 142, the positive electrode terminal 143, the negative electrode terminal 144, and/or the positive electrode junction portion 145 are formed of a plating layer, a terminal and a connection portion having high density and low resistance while forming each terminal and connection with a thin thickness.

A method of forming the plating layer is not particularly limited, for example, plating methods such as sputtering, subtractive, additive, a semi-additive process (SAP), a modified semi-additive process (MSAP), or the like, may be used.

In a modified form of an embodiment of the present disclosure, if necessary, a positive terminal may include a positive electrode extension portion, and a negative electrode terminal may include a negative electrode extension portion.

FIGS. 5 to 7C are schematic diagrams illustrating a tantalum capacitor 200 in which a positive electrode extension portion 246 and a negative electrode extension portion 247 are formed. Referring to FIGS. 5 to 7C, the positive electrode extension portion 246 may be connected to a positive electrode connection portion 241, and may be exposed to the first surface S1 of the tantalum capacitor 200. In addition, the negative electrode extension portion 247 may be connected to a negative electrode connection portion 242, and may be exposed to the second surface S2 of the tantalum capacitor 200. When the positive electrode extension portion 246 and/or the negative electrode extension portion 247 are disposed, it may be used as a connection terminal when mounting a substrate.

A lower surface of the positive electrode connection portion 241 and an upper surface of the positive electrode terminal 243 of the tantalum capacitor 200 according to the present disclosure may be disposed to be in contact with each other. In this case, the positive electrode connection portion 241 and the positive electrode terminal 243 may have different sizes from each other, and the positive electrode connection portion 241 may be disposed to be skewed in any one direction of the first direction (X direction).

Figure 7A:
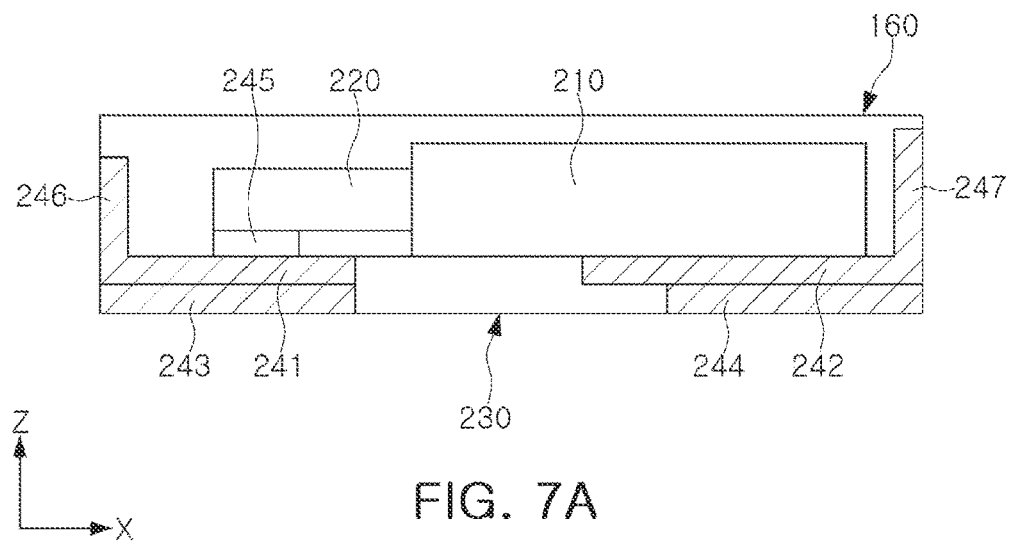
FIGS. 7A to 7C are cross-sectional views illustrating a modified form of a tantalum capacitor according to an embodiment of the present disclosure.
Figure 7B:
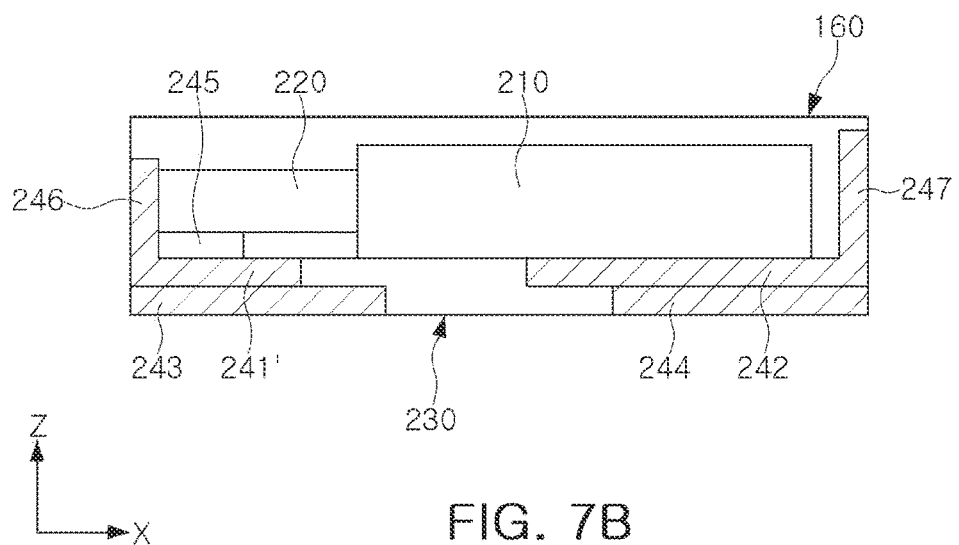
Figure 7C:
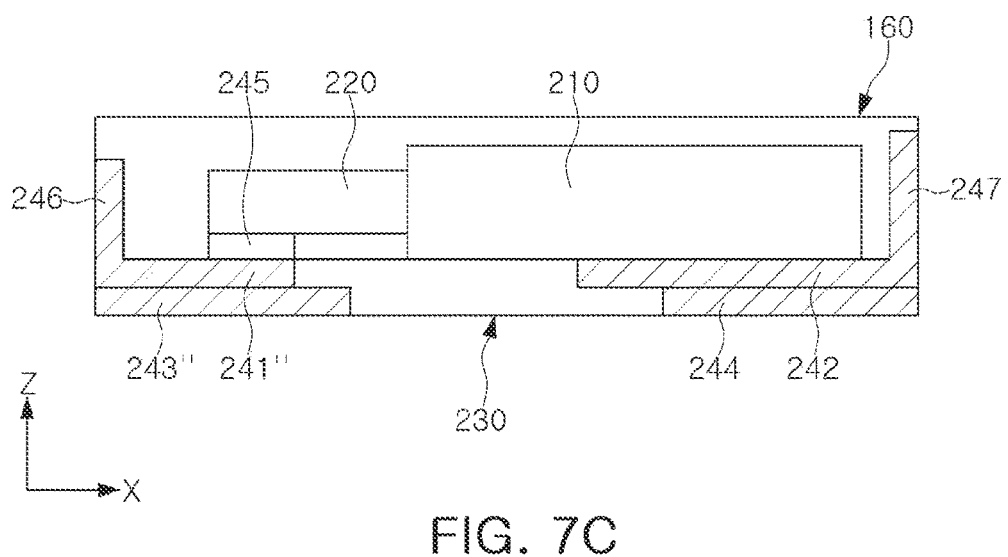

FIGS. 7A to 7C show a modified form of a dispositional form of the positive electrode connection portion 241 and the positive electrode terminal 243. Referring to FIGS. 7A to 7C, the positive electrode connection portion 241 and the positive electrode terminal 243 of the tantalum capacitor 200 according to the present disclosure may have substantially the same lengths as each other (FIG. 7A) or different lengths from each other (FIGS. 7B and 7C). In addition, the positive electrode connection portion 241 may be disposed to be skewed in any one direction of the first direction (X direction) with respect to the positive electrode terminal 243 by being coupled to the positive electrode extension portion 246 (FIGS. 7B and 7C). When the positive electrode connection portion 241 and the positive electrode terminal 243 are disposed to be in contact with a large area, mechanical strength of the tantalum capacitor 200 having a two-layer substrate structure may be improved.

In addition, when the positive electrode connection portion 241 is disposed to be skewed towards the first surface S1 of the tantalum capacitor 200, and away from the tantalum body 210 in the first direction, with respect to the positive electrode terminal 243 (FIG. 7C), an interval between the tantalum body 210 and the positive electrode connection portion 241 can be maximized to prevent shorts. In the present example, the description was made based on the positive electrode connection portion 241 and the positive electrode terminal 243, but the same modified form may also be applied to the negative electrode connection portion 242 and the negative electrode terminal 244.

In an embodiment of the present disclosure, a substrate 130 of the tantalum capacitor 100 may include a curable resin 150 (250 in FIGS. 5 and 6) and an inorganic filler. The curable resin 150 may be a thermosetting resin, a photocurable resin, or a dual curable resin including both thermosetting and photocuring properties. In the present specification, "thermosetting resin" refers to a resin that can be cured through an appropriate application of heat or an aging process, and "photocurable resin" refers to a resin that can be cured by irradiation of electromagnetic waves. In the categories of electromagnetic waves described above, microwaves, infrared (IR), ultraviolet (UV), X-rays and y-rays, as well as particle beams such as a-particle beams, proton beams, neutron beams, and electron beam may be included. The photocurable resin may be a cationic curable and/or radical curable resin, but is not limited thereto.

The curable resin 150 may be a resin including a thermosetting functional group such as an isocyanate group, a hydroxy group, a carboxyl group, an amide group, an epoxide group, a cyclic ether group, a sulfide group, an acetal group or a lactone group, and/or a functional group curable by irradiation of electromagnetic waves. In addition, as specific types of resins as described above, acrylic resins, polyester resins, isocyanate resins, epoxy resins, or the like, may be included, but are not limited thereto.

A specific example of the curable resin 150, may be, an epoxy resin such as a cresol novolac epoxy resin, a bisphenol A-type epoxy resin, a bisphenol A-type novolac epoxy resin, a phenol novolac epoxy resin, a multifunctional epoxy resin, a biphenyl type epoxy resin, a xylog-type epoxy resin, a triphenol methane-type epoxy resin, an alkyl-modified triphenol methane epoxy resin, a naphthalene-type epoxy resin, a dicyclopentadiene-type epoxy resin, and a dicyclopentadiene-modified phenol-type epoxy resin, and the like, but are not limited thereto.

In one example, an inorganic filler of the substrate of the present disclosure may include at least one or more selected from a group consisting of silica ($SiO_2$), alumina ($Al_2O_3$), silicon carbide (SiC), barium sulfate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) When the tantalum capacitor according to the present disclosure includes the inorganic filler, the strength of the substrate can be improved, and thus a substrate having a thin thickness can be applied.

In one example of the present disclosure, an inorganic filler included in the substrate of the tantalum capacitor may have an average D50 particle diameter of 0.01 μm to 5 μm. In the present specification, a D50 particle diameter may mean a particle diameter of a particle, corresponding to 50% of a total volume, when a volume is accumulated from small particles by measuring a particle diameter by using a particle size analyzer. The D50 particle diameter may be 0.01 μm or more, 0.02 μm or more, 0.03 μm or more, 0.04 μm or more, or 0.05 μm or more, and may be 5 μm or less, 4.5 μm or less, 4.0 μm or less, 3.5 μm or less, or 3.0 μm or less, but limited thereto.

When the substrate according to the present disclosure includes an inorganic filler having a particle diameter, smaller than the above-described range, the strength of the substrate may not be sufficient, and when an inorganic filler having a particle diameter exceeding the above-described range is used, the curable resin of the substrate may not be uniformly cured.

According to an embodiment of the present embodiment, an inorganic filler included in a substrate may be included in a range of 10% by weight to 90% by weight based on a total weight of the substrate. A content of the inorganic filler may be a result obtained by analyzing samples taken from any five locations on the substrate. The inorganic filler may be 10% by weight or more, 15% by weight or more, or 20% by weight or more of the total substrate, and may be 90% by weight or less, 85% by weight or less, or 80% by weight or less, but is not limited thereto. When the content of the inorganic filler is included, less than the above-describe range, sufficient substrate strength may not be obtained, and when an inorganic filler having a content, higher than the above-described range is used, a sufficient amount of the curable resin may not be cured, and thus the function of the substrate may not be exhibited.

In an embodiment of the present disclosure, the tantalum capacitor 100 according to the present disclosure may further include a molding portion 160 covering the tantalum body 110. The molding portion 160 may be disposed to surround the tantalum body 110. The molding portion 160 may be formed by transfer molding a resin such as an epoxy molding compound (EMC) to surround the tantalum body 110. The molding portion 160 may serve to protect the tantalum wire 120 and the tantalum body 110 from the outside.

The present disclosure also relates to a method of manufacturing a tantalum capacitor. The following description of the manufacturing method will be described based on the tantalum capacitor of an embodiment of the present disclosure, but this can be equally applied to other embodiments in which a positive electrode extension portion and a negative electrode extension portion are disposed.

Figure 8A:
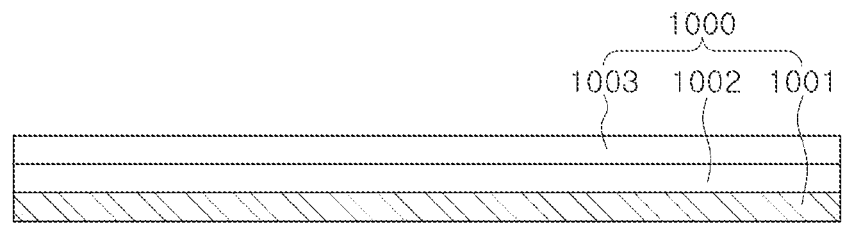
FIGS. 8A to 8J are views illustrating a manufacturing method of a tantalum capacitor according to an embodiment of the present disclosure.
Figure 8B:
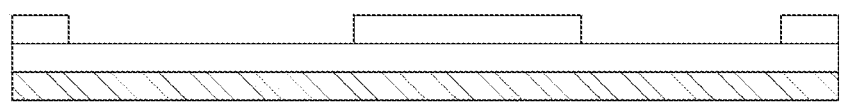
Figure 8C:
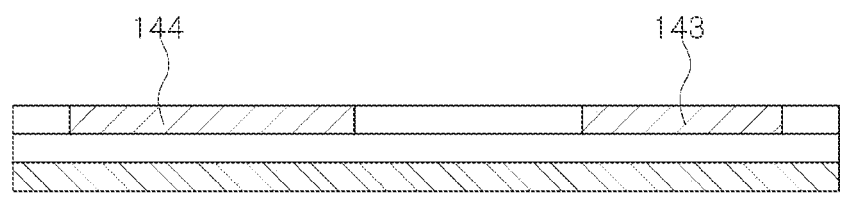

FIGS. 8A to 8J are views illustrating a method of manufacturing a tantalum capacitor according to an embodiment of the present disclosure. Referring to FIGS. 8A to 8J, a method of manufacturing a tantalum capacitor in an embodiment of the present disclosure may include a operation of etching a first resist layer 1003 on a base film 1000 in which a carrier film 1001, a base metal layer 1002, and a first resist layer 1003 are sequentially stacked. FIG. 8A schematically illustrates a base film 1000 of the present embodiment. As shown in FIG. 8A, on the base film 1000, the carrier film 1001, the base metal layer 1002, and the first resist layer 1003 may be sequentially stacked. FIG. 8B illustrates that a first resist layer 1003 on the base film 1000 is etched to form a first resist pattern. Subsequently, as shown in FIG. 8C, a first plating layer is formed on a portion of the base film 1000 in which the first resist layer 1003 is etched. The first plating layer may function as a positive electrode terminal 143 and a negative electrode terminal 144 of the tantalum capacitor 100 according to the present disclosure.

Figure 8D:
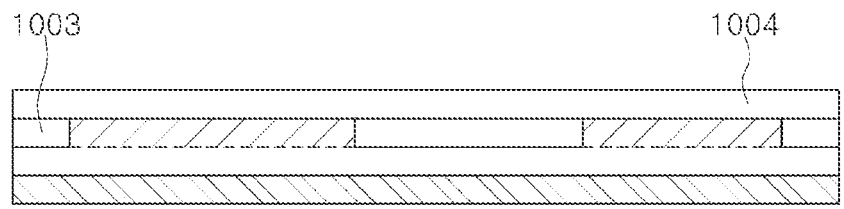
Figure 8E:
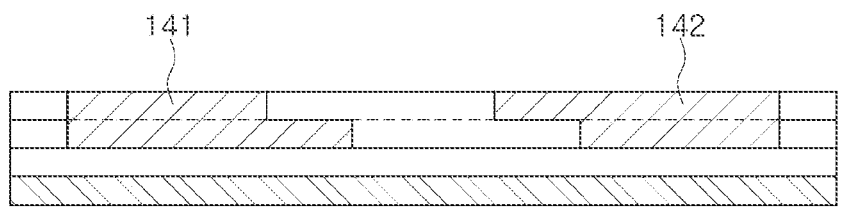

Next, as shown in FIG. 8D, a second resist layer 1004 is formed on the first plating layers 143 and 144 and the first resist layer 1003 of the base film 1000. Thereafter, as shown in FIG. 8E, after etching the second resist layer 1004, second plating layers 141 and 142 are formed on a portion in which the second resist layer 1004 is etched. The second plating layers 141 and 142 may function as a positive electrode connection portion 141 and a negative electrode connection portion 142 of the tantalum capacitor 100 according to the present disclosure.

Figure 8F:
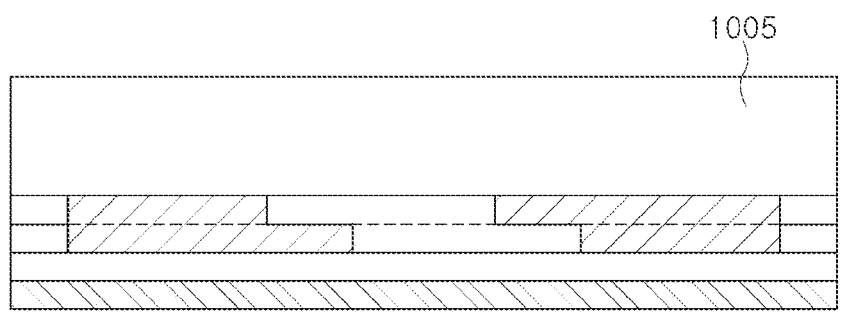
Figure 8G:
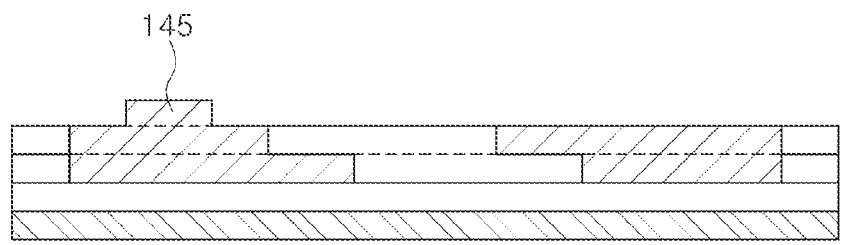
Figure 8H:
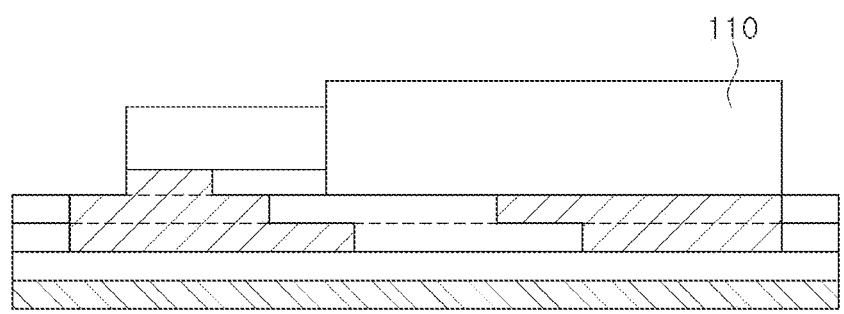
Figure 8I:
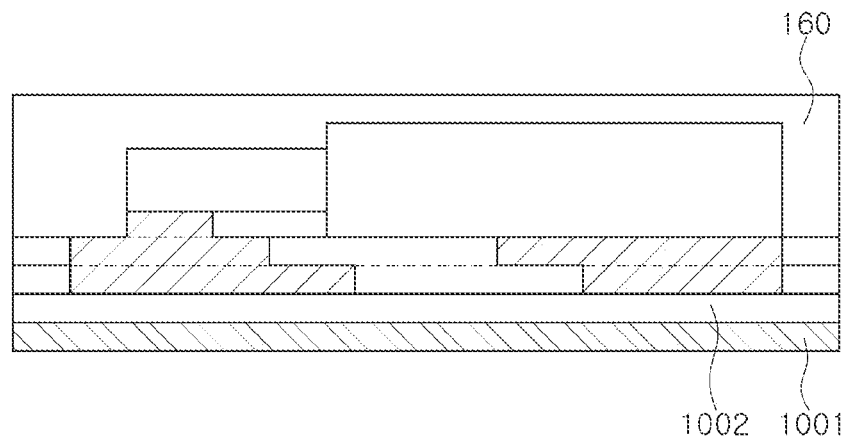
Figure 8J:
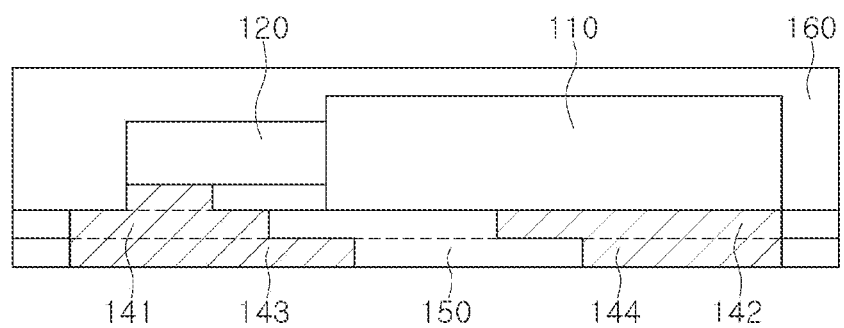

FIGS. 8F and 8G are views illustrating a process of forming a positive electrode connection portion. Referring to FIGS. 8F and 8G, a third resist layer 1005 is formed on the base film 1000 in which the second plating layers 141 and 142 are formed on the etched portion of the second resist layer 1004, a portion in which a positive electrode junction portion is to be formed, and then a positive electrode junction portion 145 may be formed on the etched portion. A method of forming the positive electrode junction portion 145 is not particularly limited, but may be formed by plating.

Next, a tantalum body 110 exposed to one surface of the tantalum wire may be mounted on the base film 1000 (FIG. 8H), and then a molding portion 160 may be formed (FIG. 8I), and a tantalum capacitor according to the present disclosure may be manufactured through cutting and separating operations. The tantalum wire of the tantalum body 100 and the positive electrode junction portion 145 and/or the negative electrode connection portion 142 and the tantalum body 100 may be connected by spot welding, laser welding, or applying a conductive adhesive. However, it is not limited thereto.

Figure 9A:
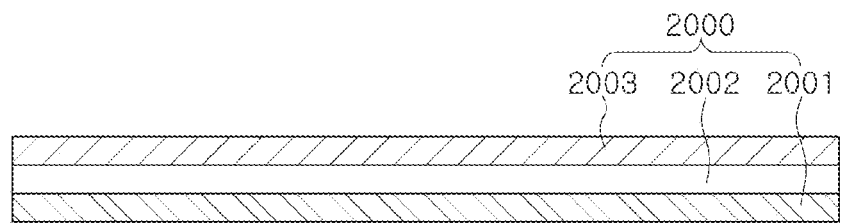
FIGS. 9A to 9O are views illustrating a manufacturing method of a tantalum capacitor according to another embodiment of the present disclosure.
Figure 9B:
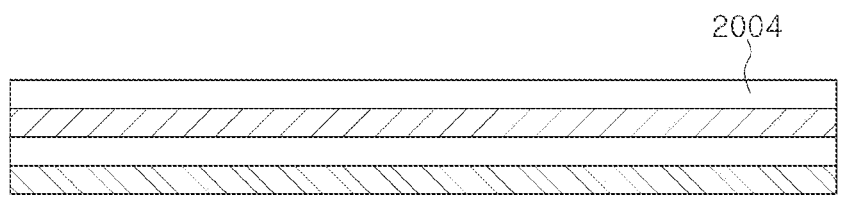
Figure 9C:
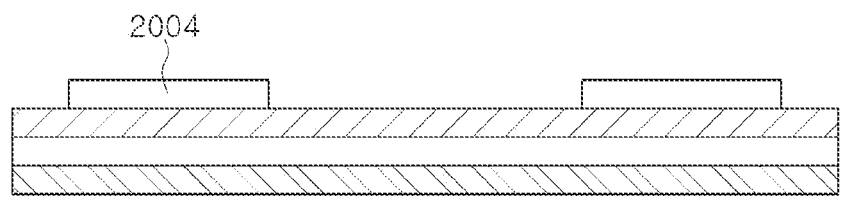
Figure 9D:
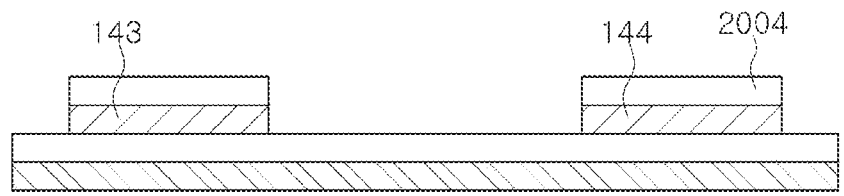
Figure 9E:
Figure 9F:
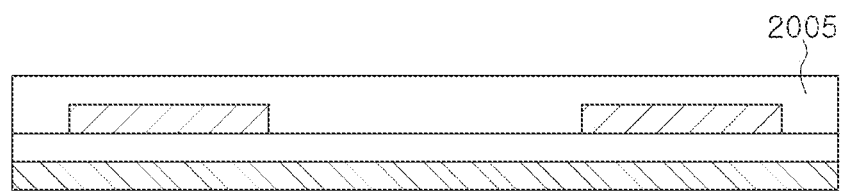
Figure 9G:
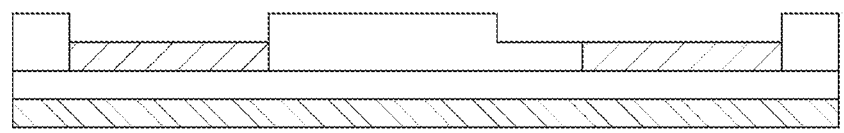
Figure 9H:
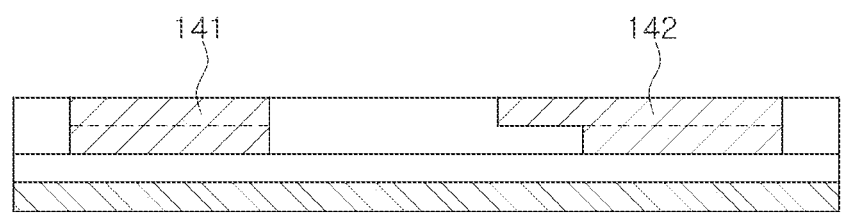
Figure 9I:
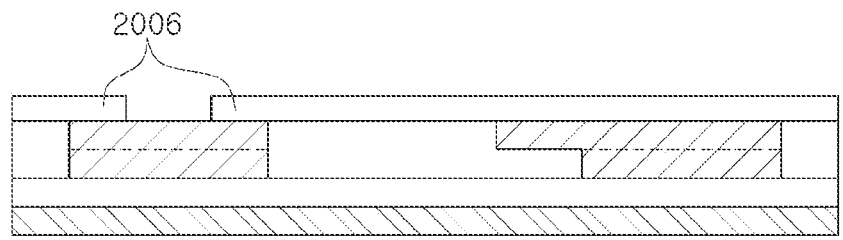
Figure 9J:
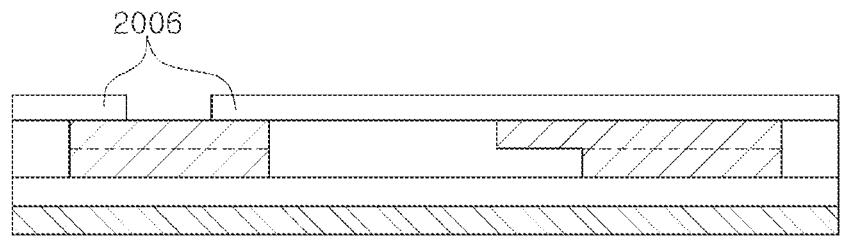
Figure 9K:
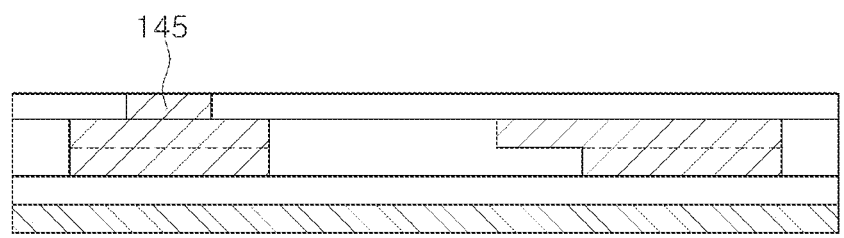
Figure 9L:
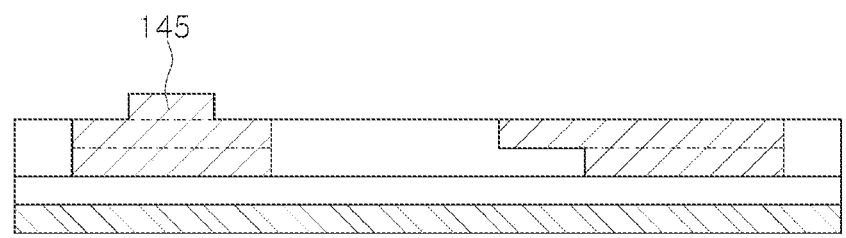
Figure 9M:
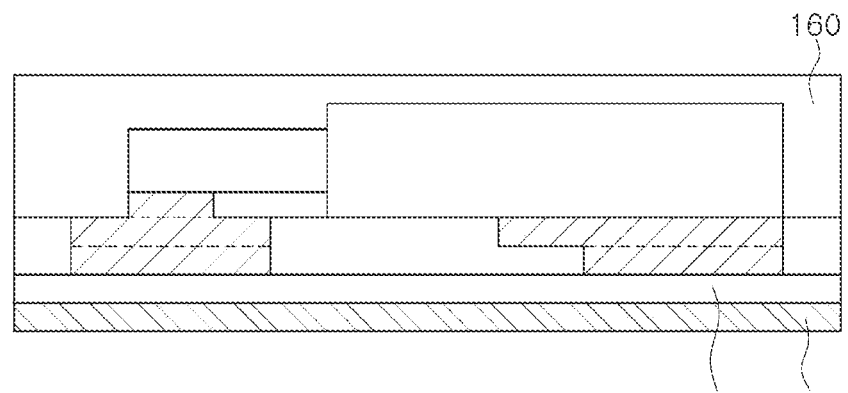
Figure 9N:
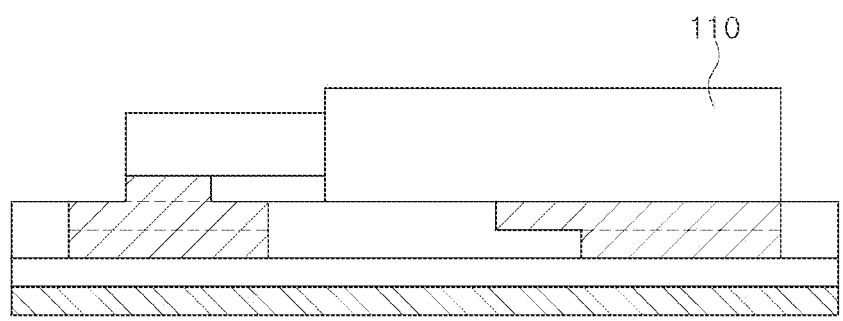
Figure 9O:
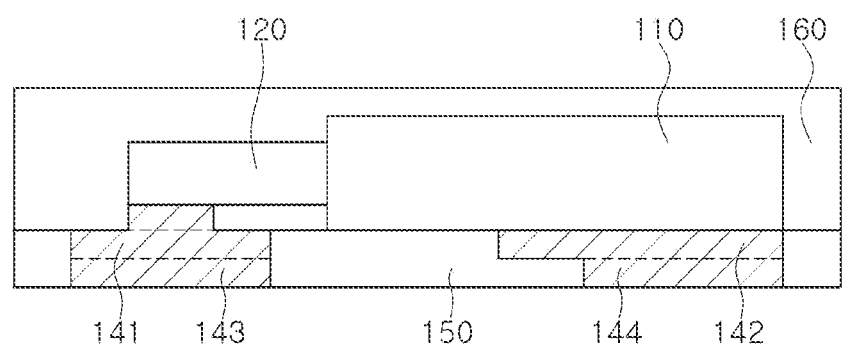

FIGS. 9A to 9O are views illustrating a method of manufacturing a tantalum capacitor according to another embodiment of the present disclosure. Referring to FIGS. 9A to 9O, a method of manufacturing a tantalum capacitor according to the present embodiment includes an operation of: forming and etching a first resist layer 2004 on a base film in which a carrier film 2001, a base metal layer 2002, and a first metal layer 2003 are sequentially stacked. FIG. 9A shows a base film according to the present embodiment, FIG. 9B shows a state in which a first resist layer 2004 is formed on the base film, and FIG. 9C is a schematic diagram illustrating a state in which the first resist layer 2004 is etched. The method for manufacturing the tantalum capacitor of the present embodiment may include: an operation of etching the first resist layer 2004, as described above, and then etching the first metal layer exposed to the etched portion. (FIG. 9D) A portion of the first metal layer remaining after the etching may function as a positive electrode terminal 243 and a negative electrode terminal 244.

FIGS. 9F to 9H illustrate a operation of forming a positive electrode connection portion 141 and a negative electrode connection portion 142 of the tantalum capacitor 200 in the method of manufacturing the tantalum capacitor according to the present embodiment. Referring to FIGS. 9F to 9H, a second resist layer 2005 is formed on the base film in which the first metal layer remains. (FIG. 9F) A portion of the second resist layer 2005 in which the positive electrode connection portion and the negative electrode connection portion are to be formed are etched to expose the first metal layer under the second resist layer. (FIG. 9G) Next, a second metal layer is formed on the exposed first metal layer to form a positive electrode connection portion 141 and a negative electrode connection portion 142. (FIG. 9H).

Subsequently, a third resist layer 2006 is formed on the base film 2000 in which the positive electrode connection portion 141 and the negative electrode connection portion 142 are formed. The third resist layer 2006 is for forming the positive electrode junction portion 145, and FIGS. 9I to 9L illustrate a process of forming the positive electrode junction portion 145 in the method of manufacturing a tantalum capacitor according to the present embodiment. A portion in which a positive electrode junction portion 145 is to be formed is etched on the third resist layer 2006, firstly formed, and the positive electrode junction portion 145 is formed on the etched portion.

Next, the tantalum body 110 on which the tantalum wire may be exposed to one surface is mounted on the base film 2000 (FIG. 9M), a molding portion 160 may be formed (FIG. 9N), and then the tantalum capacitor 100 according to the present disclosure may be manufactured through a cutting and separating process. (FIG. 9O) The tantalum wire 120 of the tantalum body 110 and the positive electrode junction portion 145 and/or the negative electrode connection portion 142 and the tantalum body 110 may be connected by spot welding or laser welding or applying a conductive adhesive, but is not limited thereto.

In an embodiment of the present disclosure, the first metal layer, the second metal layer, and/or the positive electrode connection portion may be formed by plating. A method of forming the plating layer is not particularly limited, for example, may be plating methods such as sputtering, sub-tractive, additive, a semi-additive process (SAP), a modified semi-additive process (MSAP), or the like.

In an example of the present disclosure, the resist layer of the above-described embodiments may include a curable resin and an inorganic filler.

In one example, the curable resin may include a photocurable resin.

The description of the photocurable resin and the inorganic filler is the same as described above, and thus which will be omitted.

As described above, a method of manufacturing a tantalum capacitor according to the present disclosure may have excellent process efficiency by using formation of a metal layer through etching and plating of a resist layer.

In the conventional case, a method of punching an already manufactured substrate to form a via hole, forming a via electrode, attaching a metal pad on the substrate, and then mounting a tantalum capacitor was used, but according to the manufacturing method of the present disclosure, a build-up method in which a resist layer and a metal layer are sequentially formed on a carrier film may be used, such that unnecessary processes may be reduced, thereby providing a tantalum capacitor having excellent production efficiency.

As set forth above, as one of various effects of the present disclosure, a tantalum capacitor with reduced equivalent series resistance (ESR) may be provided.

As one of various effects of the present disclosure, a tantalum capacitor having a high capacity may be provided.

As one of various effects of the present disclosure, a tantalum capacitor capable of improving productivity may be provided.

As one of various effects of the present disclosure, a tantalum capacitor having excellent reliability by improving mechanical strength may be provided.

However, various and advantageous advantages and effects of the present invention are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor, comprising:
   first and second surfaces facing in a first direction, third and fourth surfaces facing in a second direction, and fifth and sixth surfaces facing in a third direction;
   a tantalum body having one surface through which a tantalum wire is exposed in the first direction; and
   a substrate on which the tantalum body is mounted in the third direction,
   wherein the substrate is an organic-inorganic composite substrate,
   the substrate comprises a positive electrode connection portion connected to the tantalum wire; a negative electrode connection portion connected to the tantalum body; a positive electrode terminal connected to the positive electrode connection portion and exposed to the sixth surface; and a negative electrode terminal connected to the negative electrode connection portion and exposed to the sixth surface,
   side surfaces of the positive and negative electrode connection portions are entirely embedded in the substrate,
   the positive electrode connection portion and the positive electrode terminal are discrete layers from each other and in direct contact with each other, and the negative electrode connection portion and the negative electrode terminal are discrete layers from each other and in direct contact with each other, and the positive electrode terminal and the negative electrode terminal are exposed to the sixth surface, respectively.

2. The tantalum capacitor of claim 1, wherein each of the positive electrode terminal and the negative electrode terminal has at least one of a length or a width, greater than a thickness.

3. The tantalum capacitor of claim 1, wherein each of the positive electrode connection portion and the negative electrode connection portion has at least one of a length or a width, greater than a thickness.

4. The tantalum capacitor of claim 1, wherein:
a lower surface of the positive electrode connection portion and an upper surface of the positive electrode terminal are disposed to be in contact with each other,
a lower surface of the negative electrode connection portion and an upper surface of the negative electrode terminal are disposed to be in contact with each other,
a lower surface of the positive electrode terminal is exposed to the sixth surface, and
a lower surface of the negative electrode terminal is exposed to the sixth surface.

5. The tantalum capacitor of claim 1, further comprising a positive electrode junction portion disposed on the substrate, and
the positive electrode junction portion is connected to the positive electrode connection portion and the tantalum wire.

6. The tantalum capacitor of claim 5, wherein the positive electrode junction portion is arranged between the positive electrode connection portion and the tantalum wire with respect to the third direction.

7. The tantalum capacitor of claim 1, wherein the positive electrode connection portion and the positive electrode terminal have substantially same lengths as each other in the first direction.

8. The tantalum capacitor of claim 1, wherein the positive electrode connection portion and the positive electrode terminal have different lengths from each other in the first direction.

9. The tantalum capacitor of claim 8, wherein the length of the positive electrode connection portion is smaller than the length of the positive electrode terminal.

10. The tantalum capacitor of claim 8, wherein the positive electrode connection portion is skewed in any one direction of the first direction with respect to the positive electrode terminal.

11. The tantalum capacitor of claim 10, wherein the positive electrode connection portion is skewed towards the first surface, and away from the tantalum body in the first direction, with respect to the positive electrode terminal.

12. The tantalum capacitor of claim 1, wherein the positive electrode connection portion and the positive electrode terminal are spaced apart from the first surface, and
the negative electrode connection portion and the negative electrode terminal are spaced apart from the second surface.

13. The tantalum capacitor of claim 1, wherein the positive electrode connection portion and the positive electrode terminal are exposed to the first surface, and
the negative electrode connection portion and the negative electrode terminal are exposed to the second surface.

14. The tantalum capacitor of claim 1, wherein the positive electrode connection portion comprises a positive electrode extension portion, and the negative electrode connection portion comprises a negative electrode extension portion.

15. The tantalum capacitor of claim 14, wherein the positive electrode extension portion is exposed to the first surface, and the negative electrode extension portion is exposed to the second surface.

16. The tantalum capacitor of claim 1, wherein the substrate comprises a curable resin and an inorganic filler.

17. The tantalum capacitor of claim 16, wherein the curable resin comprises a photocurable resin.

18. The tantalum capacitor of claim 17, wherein the inorganic filler comprises at least one or more selected from a group consisting of silica ($SiO_2$), alumina ($Al_2O_3$), silicon carbide (SiC), barium sulfate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

19. The tantalum capacitor of claim 1, further comprising a molding portion covering the tantalum body.

20. A tantalum capacitor, comprising:
first and second surfaces facing in a first direction, third and fourth surfaces facing in a second direction, and fifth and sixth surfaces facing in a third direction;
a tantalum body having one surface through which a tantalum wire is exposed in the first direction; and
a substrate on which the tantalum body is mounted in the third direction,
wherein the substrate comprises a first layer having a substrate mounting surface, through which the tantalum capacitor is mounted, and a second layer on which the tantalum body is mounted,
the first layer and the second layer are in direct contact with each other,
an uppermost surface of the first layer is coplanar with a lowermost surface of the second layer,
the first layer comprises a positive electrode terminal and a negative electrode terminal, and the second layer comprises a positive electrode connection portion and a negative electrode connection portion, and
the positive electrode connection portion and the positive electrode terminal are in direct contact with each other, and the negative electrode connection portion and the negative electrode terminal are in direct contact with each other.

21. A tantalum capacitor, comprising:
a tantalum body having one surface through which a tantalum wire is exposed in a first direction; and
a substrate on which the tantalum body is mounted in a second direction,
wherein the substrate includes first and second resist layers, stacked one another in the second direction, and first and second through-holes penetrating the first and second resist layers in the second direction, and
two layers of positive electrodes are disposed in the first through-hole and two layers of negative electrodes are disposed in the second through-hole.

22. The tantalum capacitor of claim 21, wherein:
the two layers of positive electrodes include a positive electrode connection portion connected to the tantalum wire and a positive electrode terminal connected to the positive electrode connection portion and exposed to a lower surface of the tantalum capacitor in the second direction, and the two layers of negative electrodes include a negative electrode connection portion connected to the tantalum body and a negative electrode terminal connected to the negative electrode connection portion and exposed to the lower surface of the tantalum capacitor in the second direction.

23. The tantalum capacitor of claim 22, wherein:
a lower surface of the positive electrode connection portion and an upper surface of the positive electrode terminal are disposed to be in contact with each other, and
a lower surface of the negative electrode connection portion and an upper surface of the negative electrode terminal are disposed to be in contact with each other.

24. The tantalum capacitor of claim 22, further comprising a positive electrode junction portion disposed on the substrate, and
the positive electrode junction portion is connected to the positive electrode connection portion and the tantalum wire.

25. The tantalum capacitor of claim 24, wherein the positive electrode junction portion is arranged between the positive electrode connection portion and the tantalum wire with respect to the second direction.

26. The tantalum capacitor of claim 22, wherein the positive electrode connection portion and the positive electrode terminal have substantially same lengths as each other in the first direction.

27. The tantalum capacitor of claim 22, wherein the positive electrode connection portion and the positive electrode terminal have different lengths from each other in the first direction.

28. The tantalum capacitor of claim 27, wherein the length of the positive electrode connection portion is smaller than the length of the positive electrode terminal.

29. The tantalum capacitor of claim 27, wherein the positive electrode connection portion is skewed in any one direction of the first direction with respect to the positive electrode terminal.

30. The tantalum capacitor of claim 29, wherein the positive electrode connection portion is skewed towards the first surface, and away from the tantalum body in the first direction, with respect to the positive electrode terminal.

31. The tantalum capacitor of claim 22, wherein the positive electrode connection portion and the positive electrode terminal are spaced apart from a first end surface of the tantalum capacitor in the first direction, and
the negative electrode connection portion and the negative electrode terminal are spaced apart from a second end surface of the tantalum capacitor in the first direction.

32. The tantalum capacitor of claim 31, wherein the positive electrode connection portion and the positive electrode terminal are exposed to a first end surface of the tantalum capacitor in the first direction, and
the negative electrode connection portion and the negative electrode terminal are exposed to a second end surface of the tantalum capacitor in the first direction.

* * * * *